United States Patent [19]

Simpson

[11] Patent Number: 5,745,725
[45] Date of Patent: Apr. 28, 1998

[54] PARALLEL INSTRUCTION EXECUTION WITH OPERAND AVAILABILITY CHECK DURING EXECUTION

[75] Inventor: Robert John Simpson, Bristol, United Kingdom

[73] Assignee: SGS-Thomson Microelectronics Limited, Almondsbury Bristol, Great Britain

[21] Appl. No.: 678,889

[22] Filed: Jul. 12, 1996

[30] Foreign Application Priority Data

Jul. 14, 1995 [GB] United Kingdom ............. 9514433

[51] Int. Cl.$^6$ .................................................. G06F 9/30
[52] U.S. Cl. ..................... 395/390; 395/391; 395/595
[58] Field of Search ........................ 395/390, 391, 395/595

[56] References Cited

U.S. PATENT DOCUMENTS

| | | | |
|---|---|---|---|
| 5,299,321 | 3/1994 | Iizuka | 395/375 |
| 5,430,851 | 7/1995 | Hirata et al. | 395/388 |
| 5,430,852 | 7/1995 | Watanabe et al. | 395/375 |
| 5,519,864 | 5/1996 | Martell et al. | 395/650 |
| 5,553,256 | 9/1996 | Fetterman et al. | 395/393 |
| 5,613,080 | 3/1997 | Ray et al. | 395/390 |

FOREIGN PATENT DOCUMENTS

| | | | |
|---|---|---|---|
| 0 106 667 | 4/1984 | European Pat. Off. | G06F 9/38 |
| 0 520 572 | 12/1992 | European Pat. Off. | G06F 9/38 |

OTHER PUBLICATIONS

Standard Search Report issued by the European Patent Office and dated Dec. 19, 1995.

IEEE Transactions on Computers, vol. 39, No. 3, Mar. 1, 1990, pp. 349–359, Sohi, G.S., "Instruction Issue Logic For High–Performance, Interruptible, Multiple Functional Unit, Pipelined Computers".

IEE Proceedings E. Computers & Digital Techniques, vol. 139, No. 5, Part E, Sep. 1, 1992, pp. 439–449, Steven G. B., et al., "IHARP: A Multiple Instruction Issue Processor".

*Primary Examiner*—Krisna Lim
*Attorney, Agent, or Firm*—Greenfield & Sacks, P.C.; James H. Morris

[57] ABSTRACT

A succession of instructions are distributed between a plurality of multistage execution paths in a computer system. Each instruction is given a tag to identify the position of the instruction in the sequence and the execution paths of both that instruction and the preceding instruction. On entering an instruction in one execution path, register values are transferred from registers in a path executing a preceding instruction prior to completion of execution of that preceding instruction.

21 Claims, 2 Drawing Sheets

Fig.2.
INSTRUCTION SEQUENCE
| INSTRUCTION | TAG |
|---|---|
| N | X N |
| N+1 | Y(N+1) |
| N+2 | Z(N+2) |
| N+3 | X(N+3) |
| N+4 | Y(N+4) |
| N+5 | Z(N+5) |
| N+6 | Y(N+6) |
| N+7 | X(N+7) |
Fig.3.
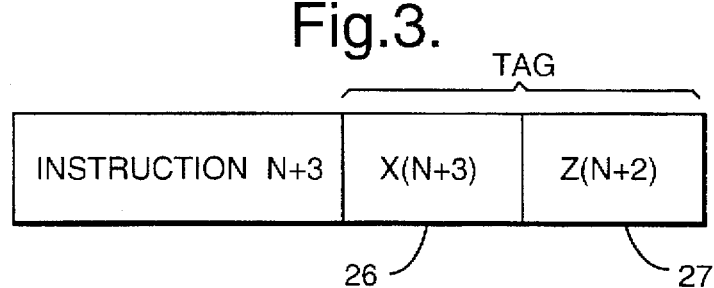
Fig.4.
REGISTER FIELDS
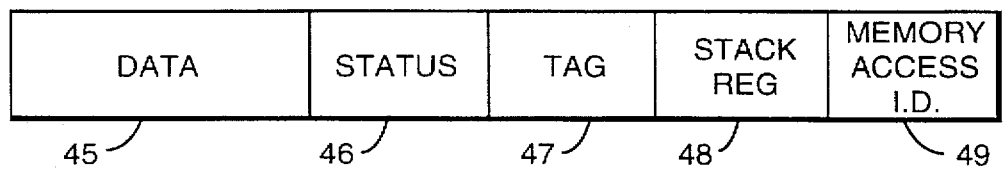

5,745,725

PARALLEL INSTRUCTION EXECUTION WITH OPERAND AVAILABILITY CHECK DURING EXECUTION

The invention relates to an improved method and apparatus for executing a sequence of computer instructions.

BACKGROUND OF THE INVENTION

The rate of execution of instructions in the processor of a computer is determined by the number of instructions that are executed per clock cycle together with the frequency of the clock. To increase the performance it is desirable to execute more than one instruction per clock cycle.

It is known to provide a plurality of execution units in parallel in order to increase the frequency of instruction execution. However problems arise in that many instructions generate values which are needed by the next instruction in the sequence so that the two instructions cannot execute in parallel. Problems may also arise with memory access operations in which one instruction reads a memory location and a subsequent instruction writes to the same location. The order of these instructions must be maintained.

It is an object of the present invention to distribute a succession of instructions between a plurality of multistage parallel execution paths allowing as many stages as possible to operate in parallel without losing coherence between values generated or obtained during the execution of the instruction sequence.

SUMMARY OF THE INVENTION

The invention provides a method of executing a plurality of instructions in a computer system having a program formed by a plurality of said instructions, which method comprises fetching a plurality of instructions in a required sequence, establishing for each instruction a first identifier of a position of the instruction in the sequence and a second identifier of a selected one of a plurality of parallel execution units for use in executing the instruction, controlling supply of successive instructions to a plurality of parallel execution units so that each instruction is supplied to an execution unit corresponding to said second identifier, and executing each instruction, at least some of said instructions being executed in a multicycle execution operation including establishing at least one register value in each execution unit, wherein, for at least some of said instructions, commencement of execution of an instruction in one execution unit includes loading into at least one register for that one execution unit a register value of a corresponding register of another execution unit which executes an immediately preceding instruction prior to completion of execution of said immediately preceding instruction, together with a status indicator of the validity of said value.

Preferably supply of each instruction to a respective execution unit is controlled by an instruction sequencer responsive to said first identifier of each instruction.

Preferably transfer of data between corresponding registers of said execution units is controlled by a register scheduler.

Preferably each instruction is provided with said first and second identifiers by an instruction despatcher and each instruction is provided with its own first and second identifiers as well as the second identifier of an immediately preceding instruction.

Preferably each instruction includes both the first and second identifiers of an immediately preceding instruction.

Preferably each register value of an execution unit includes first and second identifiers of an instruction to which the register value relates.

Preferably the register scheduler is responsive to supply of one instruction to one execution unit to identify said first and second identifiers of a preceding instruction which accompanies said one instruction. This allows the register scheduler to identify an execution unit corresponding to the second identifier of the preceding instruction and to transfer at least one register value from the identified execution unit provided the first identifier of the register value matches the first identifier of the preceding instruction. In this way the register scheduler can control transfer of data through the interconnecting circuitry by identifying register values output from an execution unit corresponding to the second identifier of the preceding instruction but only effecting data transfers if the first identifier matches indicating that the source of data to be transferred corresponds to the correct immediately preceding instruction.

Preferably said register scheduler is operated to check status values of register contents in each execution unit during execution of each instruction and to update invalid register values when valid values have become available in the execution of a preceding instruction in another execution unit.

Preferably the execution of each instruction is effected as a pipelined operation controlled by a plurality of clocked intervals and said register scheduler carries out a register status check and update operation after each clocked interval.

Preferably one or more registers of each execution unit is arranged to hold a data value together with a status indicator indicating the validity of said data value, and a pointer to identify the source of valid data if the current status is invalid.

Preferably the operation of one or more execution units may include a memory access operation.

Preferably each memory access operation is provided with an access identifier and said register scheduler is operated to update a register value by identifying a memory access identifier and loading data into an appropriate register from the memory access operation.

The execution units may be arranged to carry out similar execution functions or alternatively they may carry out respective different execution functions together with partial decoding of each instruction to determine a preferential allocation of each instruction to selected one of the parallel execution units.

Preferably the instruction sequencer is arranged to prevent execution of a new instruction after termination of execution of any one instruction in an execution unit until a next following instruction after said one instruction has commenced execution in an execution unit.

The invention also provides computer apparatus comprising a memory and a processor for executing a sequence of instructions, said processor including a plurality of parallel instruction execution units, each execution unit providing a separate multistage execution path and each including a plurality of registers, instruction fetch circuitry to fetch an instruction sequence from memory, instruction despatch circuitry for selecting which execution path each instruction is to follow, tag circuitry to provide each instruction with a tag identifying the position of that instruction in the sequence together with the selected execution path of that instruction and the execution path of an immediately preceding instruction, an instruction sequencer for controlling the supply of instructions to each execution path and controlling the beginning and end of an instruction execution operation in each execution path, and a register scheduler responsive to said tag on one instruction entering one execution path to load into one or more registers of said one execution path data values derived from a corresponding register of another execution path prior to completion of all stages of execution of a preceding instruction in said another execution path.

Preferably each of said execution units and said register scheduler are coupled to a source of clocked intervals controlling each stage of operation within the execution units and said register scheduler is arranged to update register values after each stage of operation by transfer of data between corresponding registers in different execution paths.

Preferably registers of each of said parallel execution units are interconnected by crossbar circuitry, said crossbar circuitry being coupled to and controlled by said register scheduler.

Preferably said crossbar circuitry includes memory access connections coupled to said memory.

Preferably each said execution unit includes instruction decoding circuitry together with a register stack connected to a data path and control logic.

BRIEF DESCRIPTION OF THE DRAWINGS

FIG. 2 illustrates an instruction sequence for use in the computer of FIG. 1, FIG. 3 illustrates an instruction and tag for use in the computer of FIG. 1 and FIG. 4 indicates register fields for use in one or more registers of FIG. 1.

DESCRIPTION OF THE PREFERRED EMBODIMENT

Figure 1:
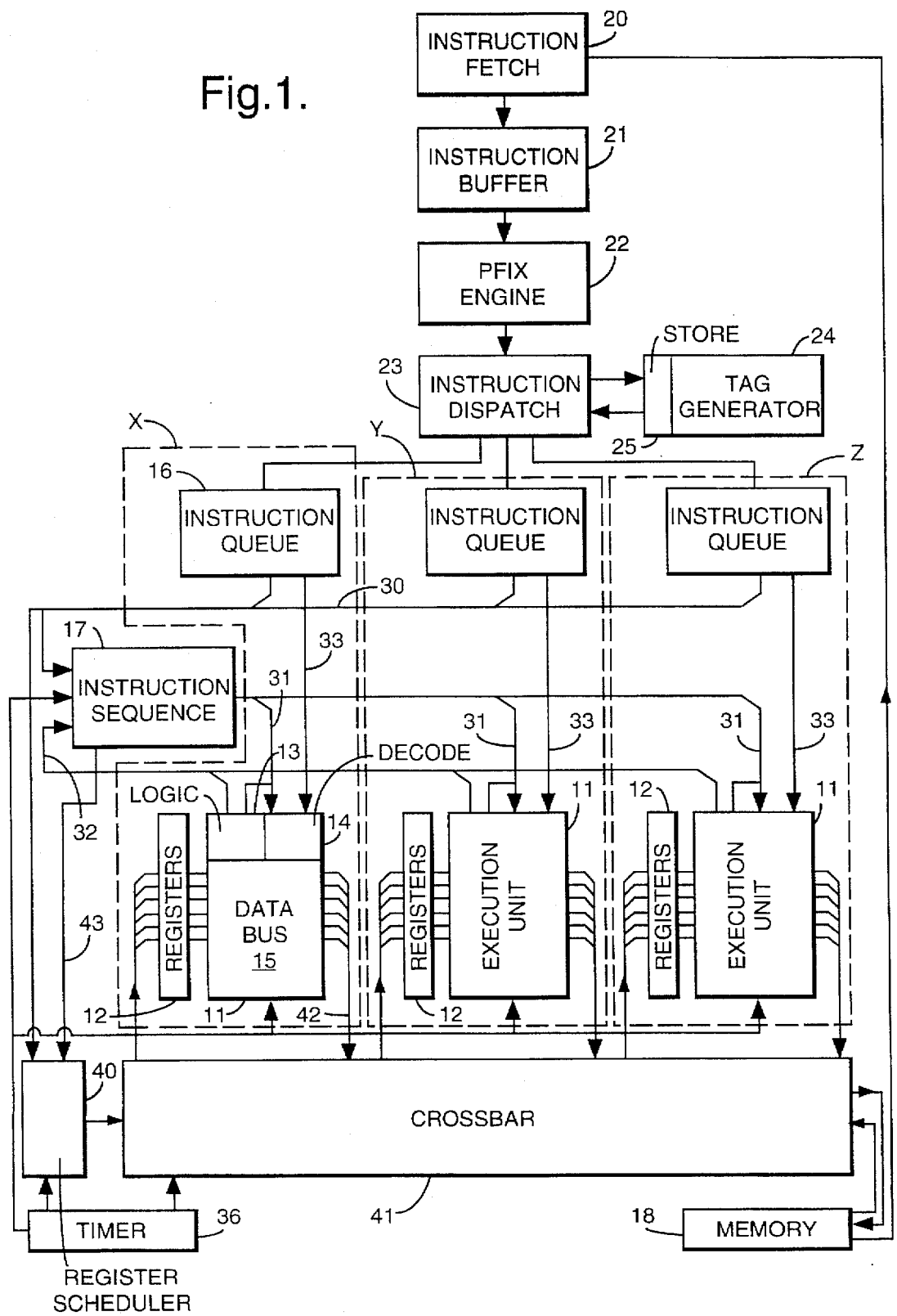
FIG. 1 shows schematically a computer having multiple execution units in accordance with the present invention.

The example described is adapted to operate with an instruction set of the type described in our U.S. Pat. No. 5,031,092 and involves a stack of three registers A, B and C as well as memory during execution of instruction sequences.

Whereas the above mentioned U.S. Patent uses a single execution unit this example has three parallel execution paths X, Y and Z each including its own execution unit 11 and register stack 12. Each execution unit includes control logic 13, an instruction decode unit 14 and a data bus 15. Each register stack consists of three registers A, B and C. Each execution path also includes an instruction queue circuit 16 for holding a queue of instructions prior to supply to the respective execution unit under the control of an instruction sequencer 17.

The computer includes a memory 18 which may comprise a main memory or may include a cache memory. Instructions may be held in this memory and a sequence of instructions is fetched by an instruction fetch circuit 20. From the unit 20 instructions are fed into a FIFO buffer 21. In this example the output of the buffer 21 is fed through a Pfix engine 22 which is a circuit arranged to partially decode each instruction in the sequence to determine whether or not any operands should be concatanated before supply to an execution unit. Many instructions will not require concatanation and will pass directly to an instruction despatch unit 23. This unit may again partially decode each instruction to determine which instruction path X, Y or Z the instruction should be fed to. The three instruction paths X, Y and Z may all be similar in that the execution unit 11 of each path may be arranged to carry out a similar range of execution operations. Alternatively the execution units may be arranged to carry out respective preferential execution operations in which case the instruction despatch unit 23 will decide which execution unit is most appropriate for the instruction having partially decoded the instruction. If all execution units 11 are the same then the instruction despatch unit 23 may distribute the instructions between the paths on any basis required. The instruction despatch unit 23 is connected to a tag generator 24 which operates to generate identifier tags for each instruction. Firstly it generates a first identifier to indicate the position of the instruction in the numerical sequence of instructions passing through the despatch unit 23. It also generates a second identifier identifying which of the execution paths the instruction is to be fed through. This can be seen more clearly with reference to FIG. 2. That Figure shows a sequence of instructions from instruction N to instruction N+7. The tag generated for each instruction is shown in FIG. 2 and includes a first identifier of the number between N and N+7 which corresponds to that instruction as well as a second identifier X, Y or Z to identify the execution channel to be used. The tag generator 24 includes a store 25 so that each instruction has added to it its own tag as well as the tag of the immediately preceding instruction which has been stored in the tag store 25. This produces a result as shown in FIG. 3 where the example is given for instruction N+3 and the overall tag includes a tag portion 26 identifying instruction N+3 as well as a tag portion 27 identifying the immediately preceding instruction N+2.

The despatch unit 23 then supplies each instruction in succession together with its associated tags as shown in FIG. 3 to the appropriate instruction queue 16 depending on which of the execution paths has been selected by the despatch unit 23.

The instruction sequencer 17 is connected by path 30 to each of the instruction queue circuits 16 so that it is informed when there is an instruction on any one queue awaiting advancement to the appropriate execution unit 11. The instruction sequencer 17 is responsive to the first identifier in the tag of each instruction to indicate its numerical position in the instruction sequence so as to control the supply of new instructions to each of the execution units 11. The control is such that when one instruction has been supplied to one execution unit, no further instruction may be sent to that one execution unit until after the instruction immediately following said instruction in the instruction sequence has been supplied to its selected execution unit. The instruction sequencer 17 provides an input on line 31 to the control logic 13 of each execution unit 11 as well as receiving a signal on line 32 from the control logic 13 of each execution unit. In this way no instruction is considered by the sequencer 17 to have terminated execution in an execution unit 11 until the immediately following instruction in the numerical sequence has already been fed into an execution unit 11 to commence execution. When the instruction sequencer 17 indicates that a new instruction can be fed to an execution unit 11 the next instruction on the queue held in any one of the circuits 16 is fed on line 33 into a decode unit 14 of the execution unit and the execution may be carried out as a multistage sequential operation or pipelined operation. Some instructions may be executed in a single cycle but in this example most instructions require multiple cycles for execution. Each stage in the pipeline is carried out in accordance with controlled time intervals derived from a timer 36 providing clock pulses to all units of FIG. 1 including each of the execution units 11, the instruction sequencer 17, as well as a register scheduler 40 and crossbar connecting circuitry 41. Each instruction entering an execution unit has the tags of the format shown in FIG. 3 and the execution unit outputs on line 42 a signal to the crossbar connecting circuitry 41 indicating the second tag portion 27 of the instruction identifying the immediately preceding instruction. The register scheduler 40 in response to a signal on line 43 indicating that a new instruction has been supplied to an execution unit 11 causes the crossbar circuitry 41 to interconnect the register stack 12 of the execution unit 11 receiving the new instruction with the register stack of the execution unit identified by the second tag portion 27 of the instruction. The register scheduler 40 checks that the register stack is being used for execution of the immediately preceding instruction by checking tag fields 47 of the register entries to see that the instruction number corresponds to that of the immediately preceding instruction. Each of the registers in the register stack 12 of each execution unit 11 has a plurality of register fields as shown in FIG. 4. These include a first field 45 holding data for that register. A second field 46 indicates whether that data is valid. A third field 47 may hold a tag value indicating both instruction number and execution channel. A further field 48 includes an indication of which register in the stack is appropriate for this particular register entry. A further field 49 includes an identifier of a memory access operation if one has been made during execution of the instruction.

When execution of a new instruction commences, its associated register stack 12 is loaded with data existing at that time in the corresponding registers identified by the tag of the preceding instruction provided the instruction number of the tag agrees with the number of the preceding instruction. This transfer of data is effected by interconnection between the register stacks 12 through the crossbar circuitry 41 controlled by the register scheduler on finding agreement of the relevant tag indicators. It will be appreciated that this transfer of data from the registers associated with execution of a preceding instruction may commonly occur prior to completion of execution of the immediately preceding instruction or in some cases before execution of the preceding instruction has started. For this reason the data in each of the registers in the stack may not yet be valid. Consider for example execution of instruction N+1 in channel Y. As soon as instruction N+1 enters execution unit 11 of channel Y the preceding instruction is indicated as XN and consequently the register values held at that time in the stack of channel X will be copied into the register stack of channel Y. Instruction N may be only part-way through its multistage execution operation. However execution of instruction N+1 can commence and progress as far as possible until it is requiring a value which has not yet been generated either by execution of instruction N or by a memory access operation which was initiated by execution of instruction N. Once in every cycle of operation of the multistage execution operation the register scheduler 40 checks all registers which are holding a status indicator 46 indicating invalid data to see whether or not an update is possible to give valid data from a register entry with correct tag indicators or to obtain data now received by the crossbar circuit 41 from a memory access operation. In this way the register stack of each execution unit 11 will be updated as far as possible every cycle of operation of the execution unit. It will be understood that the crossbar 41 will receive current register values on the output lines 42 after each cycle of execution even though the execution unit has not yet loaded those register values into the register stack 12. All three execution paths will be operating as fully as possible in parallel and delays in the execution of each instruction while waiting some result to be derived from execution of a previous instruction will be minimised.

Referring to FIG. 4, the status indicator 46 in each register field may have one of three values. It may indicate "valid" in which case the data in field 45 is valid and may be used by an instruction. It may be "indirect" in which case the data is not yet valid and it indicates that a valid value will at some time be transferred from another execution unit. The third alternative is that it indicates "MEM ACCESS". This indicates that the valid value is being read from a memory access operation. In this case it is necessary to identify which access operation will give the required data for this register. The memory access operations are given a numerical identification between 0 and 3 and this numerical identification is included in field 49 in a case where the status field 46 indicates that a memory access operation will be the source of the correct data. When the status is indicated as "indirect" it is necessary to indicate which unit will supply the correct data in due course. This will be indicated by the tag field 47 which will indicate which channel and which numerical instruction will provide the correct data. Field 48 will in this case indicate whether it will be the A, B or C register that will be the source of this valid data.

During execution of any instruction which will generate a new value that may not be valid for one or more cycles the instruction is arranged to output a "indirect" status on a register output to the appropriate register of its stack 12 indicating the tag of that instruction itself. This causes a subsequent instruction to check that register output each cycle until the value held in the register has a status indicator 46 indicating that the data is valid.

In operation of the above example, an instruction may be issued to an execution unit whenever the execution unit is free and there is an instruction waiting in the appropriate queue 16. The instruction is responsible during its execution for checking the valid status indicator of any register which is being used. If the register value is not being used then the value and status may be output immediately. The register values may also be pushed or popped even if the status indicator is not valid. This allows instructions that generate new stack values but do not use existing values to execute and retire before previous instructions have completed.

If an instruction (B) completes before the previous instruction (A) starts execution, a flag associated with the previous instruction (which will be in the instruction queue) is set. This allows instruction A to complete without checking that instruction B has started. This is required because B will have finished and A will have no other means of checking this.

The instruction number part of the tag need only have enough values to cover the number of instructions in the queue plus the instruction that is executing, e.g. if the instruction queues can hold 3 instructions, only 4 values (0, 1, 2, 3) are needed. When an instruction has completed, the instruction number can be reused.

It will be seen the that instruction sequencer is operated to prevent incoherence arising between the data values used by the various instructions.

The invention is not limited to the details of the foregoing example.

The instruction decoders may be arranged to decode more than one instruction in each cycle. Some instructions in a program sequence may be single cycle instructions.

I claim:

1. A method of executing a plurality of instructions in a computer system, said method comprising:
   (a) fetching the plurality of instructions in a required sequence;
   (b) establishing for each instruction in the sequence a first identifier of a position of the instruction in the sequence and a second identifier of a selected one of a plurality of parallel execution units for use in executing the instruction;
   (c) supplying successive instructions in the sequence to said plurality of parallel execution units so that each instruction in the sequence is supplied to an execution unit corresponding to said second identifier, each execution unit having respective registers; and
   (d) executing each instruction in the sequence, at least some of said instructions in the sequence being executed in a multicycle execution operation in which availability of operands is checked during execution, wherein execution of at least one instruction of the at least some of said instructions includes
      (1) execution of the at least one instruction in one of said execution units by transferring into at least one register of said one execution unit a register value of a corresponding register of another of said execution units which executes an immediately preceding instruction in the sequence prior to completion of execution of said immediately preceding instruction, together with a status indicator of the validity of said values
      (2) checking said status indicator after the transfer, and
      (3) completing execution in dependence on the status check.

2. A method according to claim 1 wherein supplying successive instructions is controlled by an instruction sequencer responsive to said first identifier of each instruction.

3. A method according to claim 1 wherein the transfer of data between corresponding registers of said execution units is controlled by a register scheduler.

4. A method according to claim 1 wherein each instruction in the sequence is provided with said first and second identifiers by an instruction dispatcher and each instruction in the sequence is provided with its own first and second identifiers as well as the second identifier of an immediately preceding instruction in the sequence.

5. A method according to claim 4 wherein each instruction in the sequence is provided with said first and second identifiers by an instruction dispatcher and each instruction in the sequence is provided with its own first and second identifiers as well as the first and second identifiers of an immediately preceding instruction in the sequence.

6. A method according to claim 5 wherein the at least one register of said one execution unit includes a register value that includes the first and second identifiers of the at least one instruction.

7. A method according to claim 3 wherein:
   the at least one register of said one execution unit includes a register value of that includes the first and second identifiers of the at least one instruction; and
   said register scheduler is responsive to supply of the at least one instruction to said one execution unit to identify said first and second identifiers of said immediately preceding instruction and to transfer the register value of said another execution unit identified by said second identifier of the at least one instruction to a corresponding register of said one execution unit when the second identifier included in the register value of the at least one register of said one execution unit matches the first identifier of said immediately preceding instruction.

8. A method according to claim 3 wherein said register scheduler checks status indicator values of register contents in each execution unit during execution of the at least one instruction and updates invalid register values when valid register values have become available in the execution of said immediately preceding instruction in said another execution unit.

9. A method according to claim 3 wherein execution of each instruction in the sequence is effected as a pipelined operation controlled by a plurality of clocked intervals and said register scheduler carries out a register status check and update operation after each clocked interval.

10. A method according to claim 1 wherein one or more of the respective registers of each execution unit is arranged to hold a data value together with said status indicator indicating the validity of said data value, and a pointer to identify a source of valid data when said status indicator indicates said data value is invalid.

11. A method according to claim 1 wherein operation of one or more execution units includes a memory access operation.

12. A method according to claim 3, further comprising:
    performing memory access operations wherein each memory access operation is provided with a memory access identifier and wherein said register scheduler is operated to update a register value of the at least one register by identifying the memory access identifier and loading data into an appropriate register of the at least one register from the memory access operation.

13. A method according to claim 1 wherein executing the at least one instruction includes decoding the at least one instruction.

14. A method according to claim 1 wherein each of said execution units is arranged to carry out similar execution functions.

15. A method according to claim 1 wherein said execution units are arranged to carry out different execution functions and the method includes partial decoding of each instruction in the sequence to determine a preferential allocation of each instruction to the selected one of said execution units.

16. A method according to claim 2 wherein the instruction sequencer prevents execution of a new instruction in the sequence after termination of execution of any one instruction in the sequence until a next following instruction after said one instruction has commenced execution in one of said plurality of execution units.

17. Computer apparatus having a memory and a processor for executing instructions, said processor comprising:
    (a) a plurality of parallel instruction execution units providing a plurality of execution paths, each execution unit providing a separate multistage execution path;
    (b) a plurality of sets of registers each set of registers being associated with a respective execution unit of said plurality of execution units:
    (c) instruction fetch circuitry to fetch an instruction sequence from said memory,
    (d) instruction dispatch circuitry for selecting which execution path of said plurality of execution paths each instruction of the instruction sequence is to follow;
    (e) tag circuitry to provide each instruction of the instruction sequence with a tag identifying a position of the instruction in the instruction sequence together with the selected execution path of the instruction and the execution path of an immediately preceding instruction of the instruction sequence:

(f) an instruction sequencer for controlling a supply of each instruction of the instruction sequence to each execution path and controlling a beginning and end of instruction execution in each execution path; and (g) a register scheduling and interconnect circuit responsive to said tag of each instruction of the instruction sequence entering the selected execution path to transfer into at least one register of the set of registers associated with said execution unit of the selected execution path the same data value as is held in a corresponding register of the set of registers associated with another execution unit of another execution path prior to completion of all stages of execution of said immediately preceding instruction in said another execution path.

18. Computer apparatus according to claim 17 wherein each of said execution units and said register scheduler are coupled to a source of clocked intervals controlling each stage of operation within id execution units and said register scheduler is arranged to update register values after each stage of operation by transfer of data between corresponding sets of registers in different execution paths.

19. Computer apparatus according to claim 17 wherein said plurality of sets of registers are interconnected by crossbar circuitry, said crossbar circuitry being coupled to and controlled by said register scheduler.

20. Computer apparatus according to claim 19 wherein said crossbar circuitry includes memory access connections coupled to said memory.

21. Computer apparatus according to claim 17 wherein each of said plurality of execution units includes instruction decoding circuitry, a data path, and control logic, each respective execution unit being connected to its associated set of registers.

* * * * *